United States Patent
Wang et al.

(10) Patent No.: US 12,210,407 B2
(45) Date of Patent: Jan. 28, 2025

(54) LOG OUTPUT METHOD AND SYSTEM FOR SERVER, AND RELATED APPARATUS

(71) Applicant: INSPUR SUZHOU INTELLIGENT TECHNOLOGY CO., LTD., Jiangsu (CN)

(72) Inventors: Wenzhi Wang, Jiangsu (CN); Yingshu Zhu, Jiangsu (CN); Anping Wang, Jiangsu (CN); Shuai Huang, Jiangsu (CN); Fengbing Cao, Jiangsu (CN); Shengnan Liang, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/270,221

(22) PCT Filed: Oct. 29, 2021

(86) PCT No.: PCT/CN2021/127404
§ 371 (c)(1),
(2) Date: Jun. 29, 2023

(87) PCT Pub. No.: WO2022/247139
PCT Pub. Date: Dec. 1, 2022

(65) Prior Publication Data
US 2024/0061738 A1 Feb. 22, 2024

(30) Foreign Application Priority Data
May 28, 2021 (CN) .......................... 202110591544.X (51) Int. Cl.
*G06F 11/07* (2006.01)

(52) U.S. Cl.
CPC ...... *G06F 11/0787* (2013.01); *G06F 11/0769* (2013.01)

(58) Field of Classification Search
CPC ............. G06F 11/0787; G06F 11/0769; G06F 11/2273; G06F 11/2268; G06F 11/2284
See application file for complete search history.

(56) References Cited

U.S. PATENT DOCUMENTS 5,944,841 A * 8/1999 Christie .............. G06F 11/3636
714/E11.2
2004/0153810 A1 8/2004 Kuo
(Continued)

FOREIGN PATENT DOCUMENTS

| CN | 103577326 A | 2/2014 |
|---|---|---|
| CN | 105204789 A | 12/2015 |

(Continued)

*Primary Examiner* — Matthew M Kim
*Assistant Examiner* — Matthew N Putaraksa
(74) *Attorney, Agent, or Firm* — IPro, PLLC (57) ABSTRACT

A log output method and system for a server, and a computer-readable storage system and a server. The method includes: after a server is powered on, determining whether a debugging switch in BIOS settings of the server is enabled (S101); if so, initializing a serial port function and making a debugging function take effect (S102); reading a printing function value in the debugging function (S103); if the printing function value is a first preset value, printing log information by means of the serial port function (S104); and if the printing function value is a second preset value, turning off a log output function (S105). The method is conducive to quickly locating a fault abnormality of a server, thereby reducing the server debugging and modification time.

20 Claims, 3 Drawing Sheets

(56) References Cited

U.S. PATENT DOCUMENTS

| | | |
|---|---|---|
| 2012/0278655 A1 | 11/2012 | Lin et al. |
| 2013/0232287 A1* | 9/2013 | Chen .................. G06F 11/2284 |
| | | 712/205 |
| 2014/0298336 A1 | 10/2014 | Taniuchi |
| 2017/0134258 A1* | 5/2017 | Kumar .................. H04L 45/02 |
| 2021/0081234 A1* | 3/2021 | Liu ...................... G06F 9/4818 |
| 2021/0373903 A1* | 12/2021 | Nelson ................. G06F 21/572 |

FOREIGN PATENT DOCUMENTS

| | | |
|---|---|---|
| CN | 107463455 A | 12/2017 |
| CN | 108874606 A | 11/2018 |
| CN | 109683964 A | 4/2019 |
| CN | 113254286 A | 8/2021 |

* cited by examiner

LOG OUTPUT METHOD AND SYSTEM FOR SERVER, AND RELATED APPARATUS

CROSS-REFERENCE TO RELATED APPLICATION

The present disclosure claims the priority of the Chinese patent application filed on May 28, 2021 before the China National Intellectual Property Administration with the application number of 202110591544.X and the title of "LOG OUTPUT METHOD AND SYSTEM FOR SERVER, AND RELATED APPARATUS", which is incorporated herein in its entirety by reference.

FIELD

The present disclosure relates to the field of servers and, more particularly, to a log output method and system for a server, and a related apparatus.

BACKGROUND

For a server, it is often necessary to perform a serial port debugging. At present, major basic input output system (BIOS) manufacturers only support to set switches when code is compiled, and customer-oriented server devices usually cannot perform device debugging. Once the BIOS execution is abnormal and carton, when locating the problems, the development engineer must re-burn the BIOS mirror image of the Debug version to locate. It is easy to destroy the operating environment of the server, which has an impact on the recurrence and locating of probabilistic problems.

SUMMARY

An object of the present disclosure is to provide a log output method for a server, a log output system for a server, a computer-readable storage system and a server. By configuring a debugging switch in a BIOS, the server is easily debugged.

In order to solve the technical problems stated above, the present disclosure provides a log output method for a server, the solution is as follows:
  after the server is powered on, determining whether a debugging switch in BIOS settings of the server is enabled;
  when the debugging switch in the BIOS settings of the server is enabled, initializing a serial port function and making a debugging function take effect;
  reading a printing function value in the debugging function;
  when the printing function value is a first preset value, printing log information by means of the serial port function; and
  when the printing function value is a second preset value, turning off a log output function.

In an embodiment, when the printing function value is the first preset value, printing the log information by means of the serial port function includes:
  when the printing function value is the first preset value, reading a log level value; and
  according to the log level value, printing the log information of a corresponding level by means of the serial port function.

In an embodiment, after reading the printing function value in the debugging function, the log output method further includes:
  according to the printing function value, writing flag data into a preset address in a preset storage unit; wherein the flag data is used to indicate to print the log information at a PEI stage initiated by the server.

In an embodiment, the log output method further includes:
  adding option settings of the printing function value and the log level value in a BIOS setting interface.

In an embodiment, when the debugging switch is not enabled, the log output method further includes:
  enabling the debugging switch, saving settings and restarting a BIOS.

In an embodiment, before reading the log level value, the log output method further includes:
  according to a type of the log information, dividing log levels; and
  configuring the log level value for the log levels.

In an embodiment, the preset storage unit is a volatile storage unit that contains an external independent power supply.

The present disclosure further provides a log output system for a server, including:
  a determining module configured for, after the server is powered on, determining whether a debugging switch in BIOS settings of the server is enabled;
  an initializing module configured for, when a determining result of the determining module is yes, initializing a serial port function and making a debugging function take effect;
  a reading module configured for reading a printing function value in the debugging function;
  a printing module configured for, when the printing function value read by the reading module is a first preset value, printing log information by means of the serial port function; and when the printing function value read by the reading module is a second preset value, turning off a log output function.

The present disclosure further provides a computer-readable storage medium storing a computer program thereon, wherein the computer program, when executed by a processor, implements the steps of the log output method for the server stated above.

The present disclosure further provides a server, including a memory and a processor, wherein a computer program is stored in the memory, and when the processor calls the computer program in the memory, the steps of the log output method for the server stated above is implemented.

The log output method for the server provided in the present disclosure, including: after the server is powered on, determining whether a debugging switch in BIOS settings of the server is enabled; when the debugging switch in the BIOS settings of the server is enabled, initializing a serial port function and making a debugging function take effect; reading a printing function value in the debugging function; when the printing function value is a first preset value, printing log information by means of the serial port function; and when the printing function value is a second preset value, turning off a log output function.

In the present disclosure, by configuring the debugging switch in the BIOS of the server, it is convenient for users to choose whether to enable the debugging switch and print the log information according to using needs. At the same time, it is convenient to output the log information directly by enabling the debugging switch when the server encounters a failure such as carton and so on, which helps to quickly locate failure anomalies of the server, reduce debugging and modification time of the server and improve operation and maintenance efficiency of the server.

The present disclosure further provides a log output system for a server, a computer-readable storage medium and a server, which have the beneficial effects stated above and are not are not discussed herein further.

BRIEF DESCRIPTION OF THE DRAWINGS

In order to explain the embodiments of the present disclosure or the technical solutions in the prior art more clearly, a brief description may be given below with reference to the accompanying drawings which are used in the description of the embodiments or the prior art, and it is obvious that the drawings in the description below are merely some embodiments of the present disclosure, and a person skilled in the art may obtain other drawings according to the provided drawings without involving any inventive effort.

DETAILED DESCRIPTION

In order to make the objects, the technical solutions and the advantages of the embodiments of the present disclosure clearer, the technical solutions according to the embodiments of the present disclosure may be clearly and completely described below with reference to the drawings according to the embodiments of the present disclosure. Apparently, the described embodiments are merely certain embodiments of the present disclosure, rather than all of the embodiments. All of the other embodiments that a person skilled in the art obtains on the basis of the embodiments of the present disclosure without paying creative work fall within the protection scope of the present disclosure.

Figure 1:
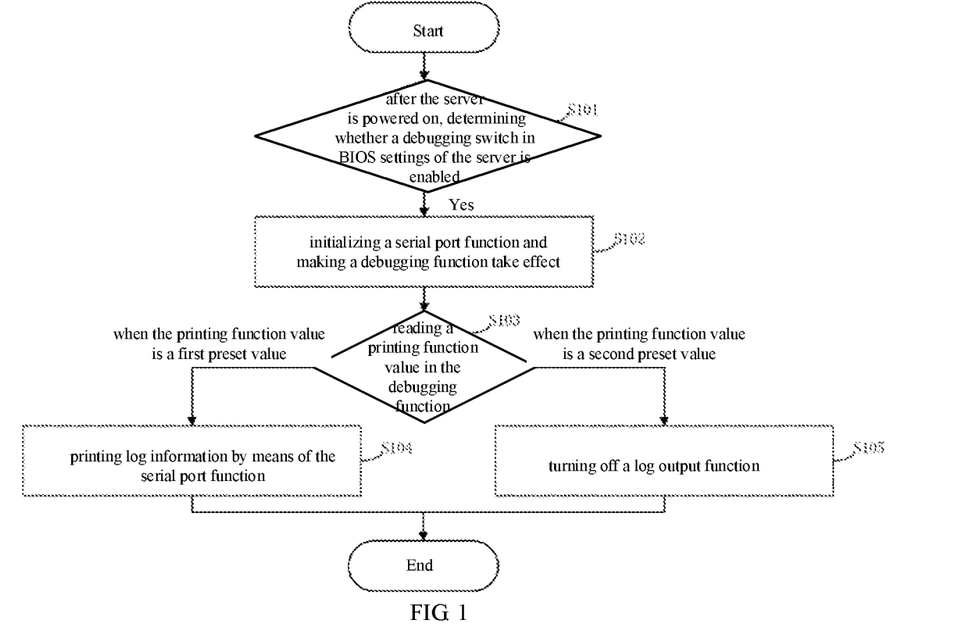
FIG. 1 is a flow chart of a log output method for a server according to the embodiments in the present disclosure.

Referring to FIG. 1, FIG. 1 is a flow chart of a log output method for a server according to the embodiments in the present disclosure, the method includes:

S101: after the server is powered on, determining whether a debugging switch in BIOS settings of the server is enabled; if yes, entering S102.

In this step, after the server is powered on, a BIOS setting interface is entered to detect whether the debugging switch is enabled. The debugging switch is dedicated to debugging the server and detecting the log output function. It should be noted that, in general, when the server is running normally, the debugging switch is in a closed state. Because when the server is debugged, it is necessary to record each running parameter of the server, generate logs and store the logs, for example, the running parameter may be process running in the server, a hardware occupancy status of the server, a hardware temperature and so on. It is necessary to record and generate the corresponding log. Therefore, the debugging process extremely occupies the server resource, and the debugging switch is in the closed state when there is no need to debug.

Figure 2:
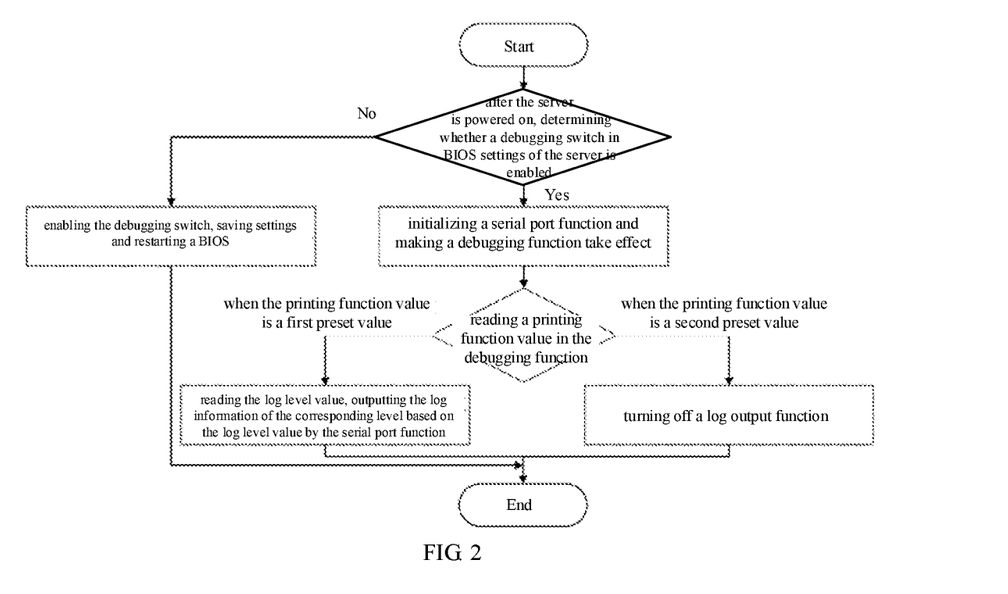
FIG. 2 is a flow chart of another log output method for a server according to the embodiments in the present disclosure.

In addition, if the debugging switch is not enabled, the debugging switch may be enabled at this moment, the settings are saved and the BIOS is restarted, so that after restarting, debugging may be performed directly and the log information may be output. Of course, the debugging may be terminated. If the debugging is chose to be continued, the corresponding flow may be referred to FIG. 2. FIG. 2 is a flow chart of another log output method for a server according to the embodiments in the present disclosure.

S102: initializing a serial port function and making a debugging function take effect.

When the debugging switch is enabled, this step needs to initialize the serial port function and make the debugging function take effect. A name of the debugging function here in the actual application process of the present embodiment is not limited. For example, the name of the debugging switch is a DebugMode switch, and the log information generated during debugging is printed by calling the serial port service by the debugging function included in the DebugMode switch.

S103: reading a printing function value in the debugging function; when the printing function value is a first preset value, entering S104; and when the printing function value is a second preset value, entering S105.

This step aims at reading the printing function value in the debugging function, wherein the printing function value is used to indicate whether the output of the log information may be implemented. The so-called printing function value refers to whether the output of the log data is implemented, and when the debugging switch is enabled, the server may already implement recording logs of various states in the server.

It is easy to understand that in the present embodiment, it is defaulted that before performing this step, an option setting of the printing function value may be added in a BIOS setting interface, so that users set the printing function value according to the debugging requirements.

S104: printing log information by means of the serial port function.

S105: turning off a log output function.

The printing function value at least contains two numerical values, namely the first preset value and the second preset value. When the printing function value is the first preset value, the serial port function may be used to print the log information. When the printing function value is the second preset value, the printing of log information is prohibited at this moment.

Following the above embodiment, similarly, the name of the printing function value is not limited here. For example, a value of OemDebugMode may be read in a DEBUG function. When the OemDebugMode is 1, it represents that the Oemdebug function takes effect, and the debugging function takes effect, and the log information may be normally printed. When the OemDebugMode is 0, it represents that the printing function of the log information is turned off. The debugging function returns directly without outputting any log information.

It should be noted that whether the log information may be output in the present embodiment is commonly determined by the debugging switch and the printing function value. Only when the debugging switch is enabled and the printing function value is the first preset value, that the log information is printed may be implemented.

In the embodiments of the present disclosure, by configuring the debugging switch in the BIOS of the server, it is convenient for users to choose whether to enable the debugging switch and print the log information according to using needs. At the same time, it is convenient to output the log information directly by enabling the debugging switch when the server encounters a failure such as carton and so on, which helps to quickly locate failure anomalies of the server, reduce debugging and modification time of the server and improve operation and maintenance efficiency of the server.

Based on the embodiments stated above, in an embodiment, if the printing function value is the first preset value, when the log information is printed, the log information may not be directly output, but the log level value may be firstly read, and according to the log level value, the log information of the corresponding level may be output. Of course, if the solution is implemented, the log levels may be divided according to a type of the log information, and the log level value may be configured for each log level. There is no limit on how to divide the log levels herein, which is usually divided according to the type of the log information. For example, the log level value may be determined according to the importance of the hardware corresponding to the log information. For example, a CPU and a memory are important components, and the log information corresponding to the temperature control is more important, while the log information corresponding to the data content actually processed by the CPU is less important than the temperature control log. Of course, the log level value corresponding to the log information may also be freely set by a person skilled in the art. By configuring the log level value, the more important log information of the log level value is preferentially printed, so that the log information with less importance is filtered, which helps the operation and maintenance personnel of the server to reduce the amount of the log information needing to be browsed and the log information with a higher priority is focused on, so that the operation and maintenance efficiency of the server is improved.

Figure 3:
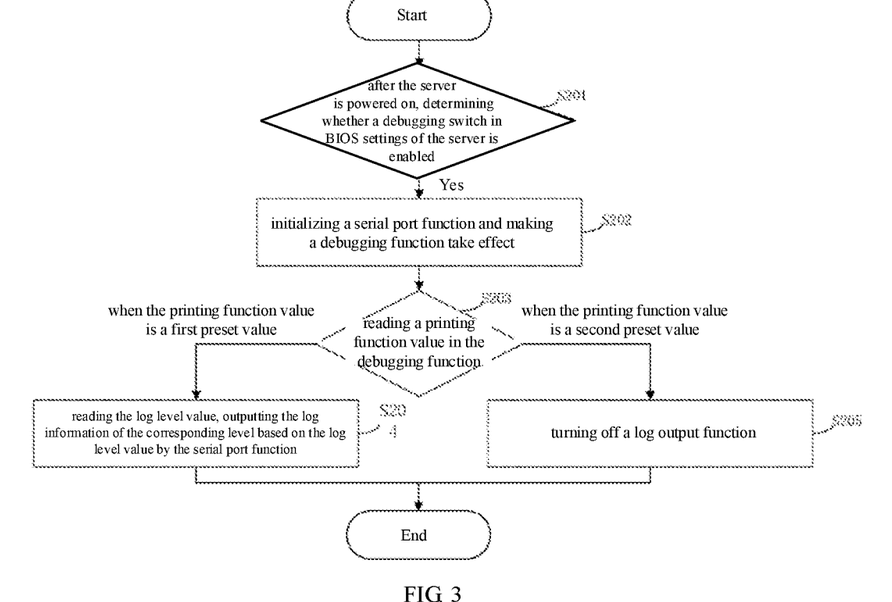
FIG. 3 is a flow chart of yet another log output method for a server according to the embodiments in the present disclosure.

At this moment, the executing process corresponding to the present embodiment is referred to FIG. 3, FIG. 3 is a flow chart of yet another log output method for a server according to the embodiments in the present disclosure, and the process is as follows:

S201: after the server is powered on, determining whether a debugging switch in BIOS settings of the server is enabled; if yes, entering S202.

S202: initializing a serial port function and making a debugging function take effect.

S203: reading a printing function value in the debugging function; when the printing function value is a first preset value, entering S204; and when the printing function value is a second preset value, entering S205.

S204: reading the log level value, outputting the log information of the corresponding level based on the log level value by the serial port function.

S205: turning off a log output function.

Of course, in the present embodiment, it is defaulted that before executing the step S204, the option setting of the printing function value may be added in the BIOS setting interface, so that users may select and configure the printing function value according to the actual debugging requirements.

The starting stage of the server usually includes four stages: security phase (SEC)→Pre-EFI initialization (PEI)→driver execution environment (DXE)→boot device selection (BDS). In the embodiments stated above, the serial port initialization function is very early, if the variables of the printing function value and the log level value, such as OemDebugMode and OemDebugMsgLevel, are read in the BIOS setting interface, the SEC and PEI stages executed in the BIOS cannot take effect, so the debugging information of these two stages cannot be printed out. In order to ensure that the whole process serial port function executed by the BIOS may be controlled by the switch set by the user. The embodiment of the present disclosure further provides a way to set variables under a complementary metal oxide semiconductor (CMOS) to assist in completing the solution.

On the basis of the embodiments stated above, after reading the printing function value in the debugging function, the log output method may further include: according to the printing function value, writing flag data into a preset address in a preset storage unit; wherein the flag data is used to indicate to print the log information at a PEI stage initiated by the server.

The preset storage unit is not limited herein, and the preset storage unit may be a volatile storage unit containing an external independent power supply. At this time, that the printing of the log information may be completed at the PEI stage at the power-on initial stage of the server may be implemented. Of course, it is also needed that the debugging switch is enabled, and the printing function value is the first preset value.

In the original scheme, two variables, that is the printing function value and the log level value, are added in the BIOS setting interface. In the debugging function, the values of the two variables are directly read for controlling the printing switch and selecting levels. However, since the variables cannot be obtained in the early flow of the SEC and the PEI during starting the BIOS, there is a problem that related switch variables cannot be read before the BIOS is started. In the present embodiment, a preset storage unit may be added as a newly added flag bit.

There is no limit to what preset storage unit is used in the present embodiment. The CMOS RAM may be used as the preset storage unit. The CMOS is short for a complementary metal oxide semiconductor, and is a technology used for manufacturing large-scale integrated circuit chips or chips manufactured by using this technology, and the chip is one piece of read-write RAM chip on a computer motherboard. Because of the read-write characteristics, the chip is used to save the data after the BIOS finishes setting the computer hardware parameters on the computer motherboard, and used to save the data.

At present, the X86 platform still retains the CMOS design, and the CPU may read and write the storage unit by means of 70/71 port access. Although the CMOS belongs to a RAM volatile storage unit, the design that the hardware is added with an external independent power supply may ensure that the CMOS has the non-volatile characteristics. In addition, the access mode of port 70/71 may be normally accessed at the earliest stage of starting the BIOS, so it is more appropriate to choose the CMOS as the storage medium to store the Flag of the DebugMode. Of course, since the CMOS is a volatile storage unit, in order to avoid losing its settings and data after the server is powered down, by configuring the external independent power source such as button batteries for the CMOS, the CMOS may become a non-volatile storage unit, that is, the CMOS is kept from losing power. Secondly, since the debugging of the server belongs to an occasional requirement, using the button batteries is sufficient to meet the debugging requirements of the normal server.

According to the above characteristics, the focus of the present disclosure is to increase the access to the CMOS space, select the preset space as the Flag storage address of the DebugMode, for example, 0x4a. Of course, the address of the preset space may be arbitrary specified by the developer. When the BIOS is started, according to the variable setting of the printing function value, the flag data is written into the preset space address in the CMOS. Assuming that the flag data 1 means On and the flag data 0 means Off, the flag data may be written into the preset space address in the CMOS. Of course, the flag data may have other forms, but it should correspond to the number of the printing function value. After the BIOS finishes performing the serial initialization at the early PEI stage, the debugging function may be executed to perform serial output. However, because the BIOS setting variables cannot be read correctly, at this moment, the debugging function may choose to read the flag bit of the preset space address in the CMOS storage space to determine the user's setting to the DebugMode. Similarly, the level setting of the OemDebuugMsgLevel is stored in other locations of the CMOS, such as 0x4b. The debugging function may also read the flag value in the corresponding CMOS space to ensure that the DEBUG mode of the BIOS may be controlled by the customer's settings in the whole process of BIOS execution.

A log output system of the server according to the embodiments in the present disclosure is introduced below, the log output system described above and the log output method of the server described above may be referred to each other.

Figure 4:
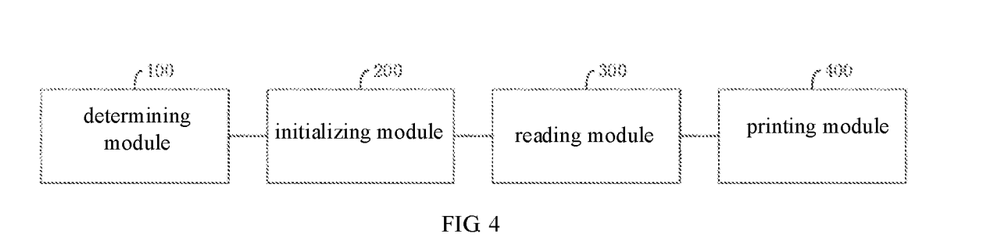
FIG. 4 is schematic diagram showing a structure of a log output system for a server according to the embodiments in the present disclosure.

FIG. 4 is schematic diagram showing a structure of a log output system for a server according to the embodiments in the present disclosure, the system includes:

a determining module 100 configured for, after the server is powered on, determining whether a debugging switch in BIOS settings of the server is enabled;

an initializing module 200 configured for, when a determining result of the determining module is yes, initializing a serial port function and making a debugging function take effect;

a reading module 300 configured for reading a printing function value in the debugging function;

a printing module 400 configured for, when the printing function value read by the reading module is a first preset value, printing log information by means of the serial port function; and when the printing function value read by the reading module is a second preset value, turning off a log output function.

Based on the embodiments stated above, in an embodiment, the printing module 400 includes:

a reading unit configured for, when the printing function value is the first preset value, reading a log level value; and a printing unit configured for, according to the log level value, printing the log information of a corresponding level by means of the serial port function.

Based on the embodiments stated above, in an embodiment, the log output system further includes:

a flag data writing unit configured for, according to the printing function value, writing flag data into a preset address in a preset storage unit; wherein the flag data is used to indicate to print the log information at a PEI stage initiated by the server.

Based on the embodiments stated above, in an embodiment, the log output system further includes:

a setting adding module configured for adding option settings of the printing function value and the log level value in a BIOS setting interface.

Based on the embodiments stated above, in an embodiment, the log output system further includes:

a restarting module configured for, when the debugging switch is not enabled, enabling the debugging switch, saving settings and restarting a BIOS.

Based on the embodiments stated above, in an embodiment, the log output system further includes:

a level dividing module configured for, before reading the log level value, according to a type of the log information, dividing log levels; and configuring the log level value for the log levels.

The present disclosure further provides a computer-readable storage medium storing a computer program thereon, wherein the computer program, when executed by a processor, implements the steps of the log output method for the server in the embodiments stated above. The storage media may include: a USB flash disk, a mobile hard disk, a read-only memory (ROM), a random access memory (RAM), a magnetic disk or an optical disc and other media that may store program code.

Figure 5:
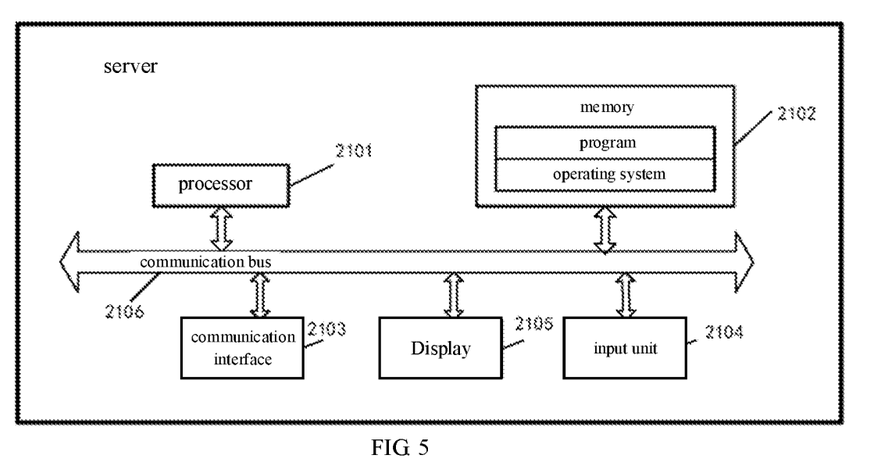
FIG. 5 is schematic diagram showing a structure of a server according to the embodiments in the present disclosure.

The present disclosure further provides a server, which may include a memory and a processor, wherein a computer program is stored in the memory, and when the processor calls the computer program in the memory, the steps of the log output method for the server in the embodiments stated above is implemented. Of course, the server may also include a variety of network interfaces, power and other components. Referring to FIG. 5, FIG. 5 is schematic diagram showing a structure of a server according to the embodiments in the present disclosure. The server in the present embodiment may include: a processor 2101 and a memory 2102.

Optionally, the server may also include a communication interface 2103, an input unit 2104, a display 2105, and a communication bus 2106.

The processor 2101, the memory 2102, the communication interface 2103, the input unit 2104 and the display 2105 communicate with each other through the communication bus 2106.

In the present disclosure, the processor 2101 may be a central processing unit (CPU), an application-specific integrated circuit, a digital signal processor, an off-the-shelf programmable gate array or other programmable logic devices.

The processor may call programs stored in the memory 2102. The processor may perform the operation performed by the server in the above embodiments.

The memory 2102 is used to store one or more programs. The program may include program code, which includes computer operation instructions. In the embodiment of the present disclosure, at least programs that are used to implement the following functions are stored in the memory:

after the server is powered on, determining whether a debugging switch in BIOS settings of the server is enabled;

when the debugging switch in the BIOS settings of the server is enabled, initializing a serial port function and making a debugging function take effect;

reading a printing function value in the debugging function;

when the printing function value is a first preset value, printing log information by means of the serial port function; and when the printing function value is a second preset value, turning off a log output function.

In a possible embodiment, the memory 2102 may include a storage program area and a storage data area, wherein the storage program area may store the operating system, as well as applications required for at least one function (such as a topic detection function). The storage data area may store the data created during using the computer.

In addition, the memory 2102 may include a high-speed random access memory and may also include a non-volatile memory, such as at least one disk memory device or other volatile solid-state memory devices.

The communication interface 2103 may be an interface of the communication module, such as an interface of a global system of mobile communication (GSM) module.

The present disclosure may also include the display 2105 and the input unit 2104 and so on.

The structure of the server shown in FIG. 5 does not constitute a limitation on the server in the embodiment of the present disclosure. In practical applications, the server may include more or less components than those shown in FIG. 5, or combine some components.

Embodiments in the specification is described in a progressive way. Each embodiment focuses on the differences with other embodiments. The same and similar parts of each embodiment may be referred to each other. For the system provided by the embodiment, because it corresponds to the method provided by the embodiment, the description is relatively simple. It may be referred to the description in the method section for relevant points.

In this paper, embodiments are used to explain the principle and implementation of the present disclosure. The above embodiments are only used to help understand the method of the present disclosure and its core ideas. It should be pointed out that, for a person skilled in the art, on the premise of not deviating from the principle of the present disclosure, there may be some improvements and modifications to the present disclosure, and these improvements and modifications also fall within the scope of protection of the claims in the present disclosure.

It should also be noted that the relational terms such as "first" and "second" in the present specification are used solely to distinguish one entity or operation from another entity or operation without necessarily requiring or implying any actual such relationship or order between such entities or operations. Furthermore, the terms like "include", "include", or any other variations thereof, are intended to indicate a non-exclusive inclusion, such that a process, method, article, or apparatus that includes a list of elements does not include only those elements but may include other elements not expressly listed or inherent to such process, method, article, or apparatus. An element defined by a phrase like "includes a . . . " does not, without further constraints, preclude the existence of additional identical elements in the process, method, article, or apparatus that includes the element.

The invention claimed is:

1. A log output method for a server, comprising:
after the server is powered on, determining whether a debugging switch in basic input output system (BIOS) settings of the server is enabled;
when the debugging switch in the BIOS settings of the server is enabled, initializing a serial port function and making a debugging function take effect;
reading a printing function value in the debugging function;
when the printing function value is a first preset value, printing log information by means of the serial port function; and
when the printing function value is a second preset value, turning off a log output function.

2. The log output method according to claim 1, wherein when the printing function value is the first preset value, printing the log information by means of the serial port function comprises:
when the printing function value is the first preset value, reading a log level value; and
according to the log level value, printing the log information of a corresponding level by means of the serial port function.

3. The log output method according to claim 2, wherein the log output method further comprises:
adding option settings of the printing function value and the log level value in a BIOS setting interface.

4. The log output method according to claim 2, wherein before reading the log level value, the log output method further comprises:
according to a type of the log information, dividing log levels; and
configuring the log level value for the log levels.

5. The log output method according to claim 1, wherein after reading the printing function value in the debugging function, the log output method further comprises:
according to the printing function value, writing flag data into a preset address in a preset storage unit; wherein the flag data is used to indicate to print the log information at a pre-EFI initialization (PEI) stage initiated by the server.

6. The log output method according to claim 5, wherein the preset storage unit is a volatile storage unit that contains an external independent power supply.

7. The log output method according to claim 1, wherein when the debugging switch is not enabled, the log output method further comprises:
enabling the debugging switch, saving settings and restarting a BIOS.

8. The log output method according to claim 1, wherein when the debugging switch in the BIOS settings of the server is enabled, the log output method further comprises:
recording running parameters of the server, generating logs and storing the logs;
wherein the running parameters comprise process running in the server, a hardware occupancy status of the server and a hardware temperature.

9. The log output method according to claim 1, wherein the printing function value and the debugging switch are used to commonly determine whether output of the log information is implemented.

10. The log output method according to claim 1, wherein when the printing function value is the first preset value, when the log information is printed, the log information is not directly output, but the log level value is firstly read, and according to the log level value, the log information of a corresponding level is output.

11. A non-transitory computer-readable storage medium storing a computer program thereon, wherein the computer program, when executed by a processor, implements operations comprising:
after a server is powered on, determining whether a debugging switch in BIOS settings of the server is enabled;
when the debugging switch in the BIOS settings of the server is enabled, initializing a serial port function and making a debugging function take effect;
reading a printing function value in the debugging function;

when the printing function value is a first preset value, printing log information by means of the serial port function; and when the printing function value is a second preset value, turning off a log output function.

12. The computer-readable storage medium according to claim 11, wherein when the printing function value is the first preset value, printing the log information by means of the serial port function comprises:

when the printing function value is the first preset value, reading a log level value; and according to the log level value, printing the log information of a corresponding level by means of the serial port function.

13. The computer-readable storage medium according to claim 12, wherein the log output method further comprises:

adding option settings of the printing function value and the log level value in a BIOS setting interface.

14. The computer-readable storage medium according to claim 12, wherein before reading the log level value, the log output method further comprises:

according to a type of the log information, dividing log levels; and configuring the log level value for the log levels.

15. The computer-readable storage medium according to claim 11, wherein after reading the printing function value in the debugging function, the log output method further comprises:

according to the printing function value, writing flag data into a preset address in a preset storage unit; wherein the flag data is used to indicate to print the log information at a PEI stage initiated by the server.

16. The computer-readable storage medium according to claim 15, wherein the preset storage unit is a volatile storage unit that contains an external independent power supply.

17. The computer-readable storage medium according to claim 11, wherein when the debugging switch is not enabled, the log output method further comprises:

enabling the debugging switch, saving settings and restarting a BIOS.

18. A server, comprising a memory and a processor, wherein a computer program is stored in the memory, and when the processor calls the computer program in the memory, operations are implemented, wherein the operations comprises:

after the server is powered on, determining whether a debugging switch in BIOS settings of the server is enabled;

when the debugging switch in the BIOS settings of the server is enabled, initializing a serial port function and making a debugging function take effect;

reading a printing function value in the debugging function;

when the printing function value is a first preset value, printing log information by means of the serial port function; and when the printing function value is a second preset value, turning off a log output function.

19. The server according to claim 18, wherein when the printing function value is the first preset value, printing the log information by means of the serial port function comprises:

when the printing function value is the first preset value, reading a log level value; and according to the log level value, printing the log information of a corresponding level by means of the serial port function.

20. The server according to claim 18, wherein after reading the printing function value in the debugging function, the log output method further comprises:

according to the printing function value, writing flag data into a preset address in a preset storage unit; wherein the flag data is used to indicate to print the log information at a PEI stage initiated by the server.

* * * * *